July 18, 1967  KINPEI OKANO  3,331,643

HOMOGENEOUS FLOW TYPE THRUST BEARINGS

Filed Feb. 18, 1964

INVENTOR
KINPEI OKANO
BY: Paul M. Craig, Jr.
ATTORNEY

United States Patent Office 3,331,643
Patented July 18, 1967

3,331,643
HOMOGENEOUS FLOW TYPE THRUST
BEARINGS
Kinpei Okano, Hitachi-shi, Japan, assignor to Hitachi,
Ltd., Tokyo, Japan, a corporation of Japan
Filed Feb. 18, 1964, Ser. No. 345,694
Claims priority, application Japan, Mar. 22, 1963,
38/19,809, 38/19,810
12 Claims. (Cl. 308—160)

This invention relates to split-type thrust bearings, and more particularly to those provided with means for preventing turbulent flow of lubricant.

An object of the present invention is to provide a split-type thrust bearing in which there is no chance for bubbles formed in the lubricant to hinder the film-formation and surface-cooling effects, which can result in reduction of bearing efficiency.

Another object of the present invention is to provide a split-type thrust bearing having means for preventing turbulent flow of lubricant therein to prevent collection of bubbles that would hinder the film-formation and surface-cooling effects of the lubricant.

There are other objects and particularities of the present invention, which will be made obvious from the following detailed description, with reference to the accompanying drawings showing shapes of thrust bearing shoes and manners of lubricant flow in the thrust bearings; in which, FIG. 1 is a partial front view of a conventional split-type thrust bearing;

Figure 1:
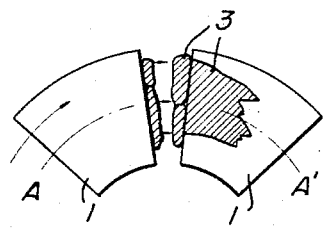
Figure 2:
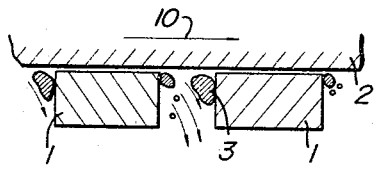
FIG. 2 is a partial sectional view taken at line A–A' in FIG. 1, showing the type of bubbles formed in the lubricant hindering the film-formation and surface-cooling effects of lubricant.

In the conventional split-type thrust bearing as shown in FIGS. 1 and 2, the sliding surfaces of bearing shoes 1 and the side surfaces of the same are perpendicular to each other in the sectional view of FIG. 2, which section is taken along the direction of shaft-rotation, that is circumferentially. When such bearing shoes 1 are immersed in the oil tank of a thrust bearing and the shaft supported thereby is rotated, many bubbles 3 are formed in the oil near the rear edge portions of shoes 1, are gathered together and stagnate between adjacent shoes 1. As the gathered bubbles 3 are enlarged, they partly enter into the space between the sliding surfaces of shoes 1 and the body of bearing 2, as shown in FIG. 1; this results in a remarkable hindrance of film-formation and surface-cooling effects of the oil, to lower the bearing efficiency extremely. In addition, the stagnate bubbles 3 hinder the circulating flow of oil in the rotational direction, and badly affect the cooling of the thrust bearing.

The present invention contemplates to prevent formation of the above-mentioned bubbles and to improve circulation of lubricant between bearing shoes 1.

Figure 3:
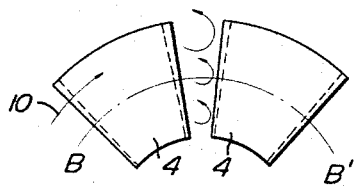
FIG. 3 is a partial front view of an embodiment of the present invention.
Figure 4:
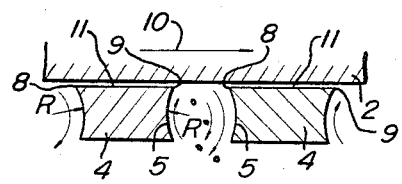
FIG. 4 is a partial sectional view taken at line B–B' in FIG. 3.
Figure 5:
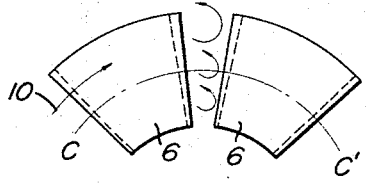
FIG. 5 is a partial front view of another embodiment of the present invention.
Figure 6:
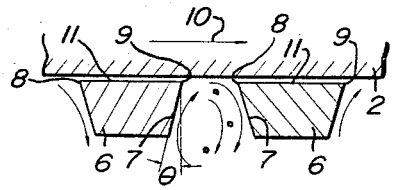
FIG. 6 is a partial sectional view taken at line C–C' in FIG. 5.

Referring to FIGS. 3 and 4, a first bearing body is arranged to cooperate with a second bearing body comprising bearing shoes 4 according to the present invention. The bearing shoes 4 have opposite side surfaces 5 or either one of them formed in concave shapes of any curve of the second degree. Alternatively, as shown in FIGS. 5 and 6 where corresponding numerals are used to indicate corresponding parts, bearing shoes 6 may have opposite side surfaces 7 or either one of them in linear forms but tapering downwardly to have gradually reduced width of the direction of rotation. In other words, each shoe 6 may have the shape of folding-fan. The taper angle $\theta$ should be an acute angle.

In each of the embodiments according to FIGURES 3, 4, and 5, 6, each bearing shoe 4, 6 has a leading edge 8 and a trailing edge 9 that are generally perpendicular to the direction of rotation identified by the arrows 10. As shown in a plane perpendicular to the leading and trailing edges, that is the circumferential plane B–B' and C–C' as shown in FIGURES 4 and 6, respectively, the side surfaces 5 and 7 form acute angles with the bearing surfaces 11 at the leading and trailing edges 8, 9. Because of these acute angles, the flow of oil will be substantially laminar along the side surfaces 5 and 7 away from the leading edges 8 and substantially laminar along the opposite side surfaces 5 and 7 toward the trailing edge. Because of this laminar flow, there will be no areas of stagnation to collect the air bubbles as in the prior art devices illustrated in FIGURES 1 and 2 that have turbulent flow.

According to the present invention, the lubricant oil between two adjacent shoes 4 in FIGS. 3 and 4 flows as shown by arrows, and the oil discharged from the rear edge portion of each shoe 4 flows along the concave side surface 5, and flows out smoothly and promptly in the direction to the under surface of shoe 4.

In the embodiment shown in FIGS. 5 and 6, the gap between two adjacent shoes 6 is naturally widened at the underside, so that lubricant oil discharged from the rear edge portion of each shoe 6 flows along the side surface 7, and flows out smoothly and promptly towards the underside direction of the bearing.

According to the present invention, there is seen no bubble-gathering and stagnation thereof in the lubricant oil as in the conventional split-type thrust bearing. Thus, any bubble cannot enter into the space between the sliding surfaces of the split-type thrust bearing according to the present invention, and the lubrication and cooling effects thereof are effective.

It should be noted that the sectional shape of the side surface of the bearing shoe may be selected freely with respect to respective radial positions. It should also be noted that the material of the bearing shoe may be directly mechanically worked to provide the required shape, or a worked piece of the different material may be secured to the side face of bearing shoe to present the required shape of side surface.

What I claim is:

1. A thrust bearing, comprising: a first bearing body having a generally planar first bearing surface; a second bearing body having a plurality of bearing shoes; each of said bearing shoes having a generally planar second bearing surface substantially parallel to and spaced from said first bearing surface a distance corresponding to an oil film thickness; each of said bearing shoes having oil guiding side surfaces; means for mounting said first and second bearing bodies for continuous relative rotational movement about an axis generally perpendicular to said bearing surfaces and for producing an axial thrust forcibly axially engaging said bearing bodies along their bearing surfaces; each of said bearing shoes having a leading and a trailing edge generally radially extending from said axis and closely adjacent to said first bearing surface; each of said bearing shoes having its second bearing surface extending continuously from its leading edge to its trailing edge; at least one edge of said leading and trailing edges being formed by the corresponding second bearing surface and a corresponding one of said oil guiding side surfaces that forms an acute angle at said one edge, when viewed in a plane perpendicular to said one edge.

2. The device according to claim 1, wherein each of said leading and trailing edges is formed by a corresponding one of said bearing surfaces and an oil guiding side surface that forms an acute angle at the corresponding edge, when viewed in a plane perpendicular to the corresponding edge.

3. The device according to claim 2, wherein each of said bearing shoes is separate, independent and has only one bearing surface; and said first bearing body has only a single bearing surface.

4. The device according to claim 3, wherein each of said bearing shoes has a shape corresponding to a portion of a sector of a circle consisting of two straight edges and two concentric semicircles, in a plane perpendicular to the axis of rotation.

5. The device according to claim 4, wherein said side surfaces are planar.

6. The device according to claim 4, wherein said side surfaces are concave.

7. The device according to claim 1, wherein said side surfaces are planar.

8. The device according to claim 1, wherein said side surfaces are concave.

9. The device of claim 2, wherein said side surfaces are planar.

10. The device of claim 2, wherein said side surfaces are concave.

11. The device of claim 3, wherein said side surfaces are planar.

12. The device of claim 3, wherein said side surfaces are concave.

References Cited

UNITED STATES PATENTS

| | | | |
|---|---|---|---|
| 1,173,369 | 2/1916 | Moore | 308—160 |
| 1,236,511 | 8/1917 | Waring | 308—160 X |
| 1,242,948 | 10/1917 | Kingsbury | 308—160 |
| 1,289,879 | 12/1918 | Newbigin | 308—160 |
| 1,315,735 | 9/1919 | Michell | 308—73 X |
| 1,442,477 | 1/1923 | Johnson | 308—160 |
| 1,664,878 | 8/1925 | Flintermann | 308—160 |
| 2,168,345 | 8/1939 | Kingsbury | 308—168 |
| 2,306,048 | 12/1942 | Fast | 308—73 |
| 2,424,028 | 7/1947 | Haeberlein | 308—73 |
| 2,657,762 | 11/1953 | Peters | 308—5 |
| 2,699,364 | 1/1955 | Schmidlin | 308—73 X |

FOREIGN PATENTS 545,908  3/1932  Germany.

MARTIN P. SCHWADRON, *Primary Examiner.*

DAVID J. WILLIAMOWSKY, *Examiner.*

R. F. HESS, *Assistant Examiner.*